No. 895,416.

PATENTED AUG. 11, 1908.

S. S. BOYD.
RAT TRAP.
APPLICATION FILED JAN. 9, 1908.

2 SHEETS—SHEET 1.

Witnesses
Phil E. Barnes.
James J. Sheehy Jr.

Inventor
S. S. Boyd.
James Sheehy
Attorney

No. 895,416. PATENTED AUG. 11, 1908.
S. S. BOYD.
RAT TRAP.
APPLICATION FILED JAN. 9, 1908.

2 SHEETS—SHEET 2.

Witnesses
Inventor
S. S. Boyd.
James Sheehy
Attorney

UNITED STATES PATENT OFFICE.

SANFORD STEWART BOYD, OF LAURENS, SOUTH CAROLINA.

RAT-TRAP.

No. 895,416.  Specification of Letters Patent.  Patented Aug. 11, 1908.

Application filed January 9, 1908. Serial No. 409,980.

*To all whom it may concern:*

Be it known that I, SANFORD STEWART BOYD, citizen of the United States, residing at Laurens, in the county of Laurens and State of South Carolina, have invented new and useful Improvements in Rat-Traps, of which the following is a specification.

My invention pertains to animal traps; and it has for its object to provide a rat trap which without being unduly expensive in construction is calculated to baffle the sagacity of rats and is otherwise possessed of high efficiency.

Figure 1:
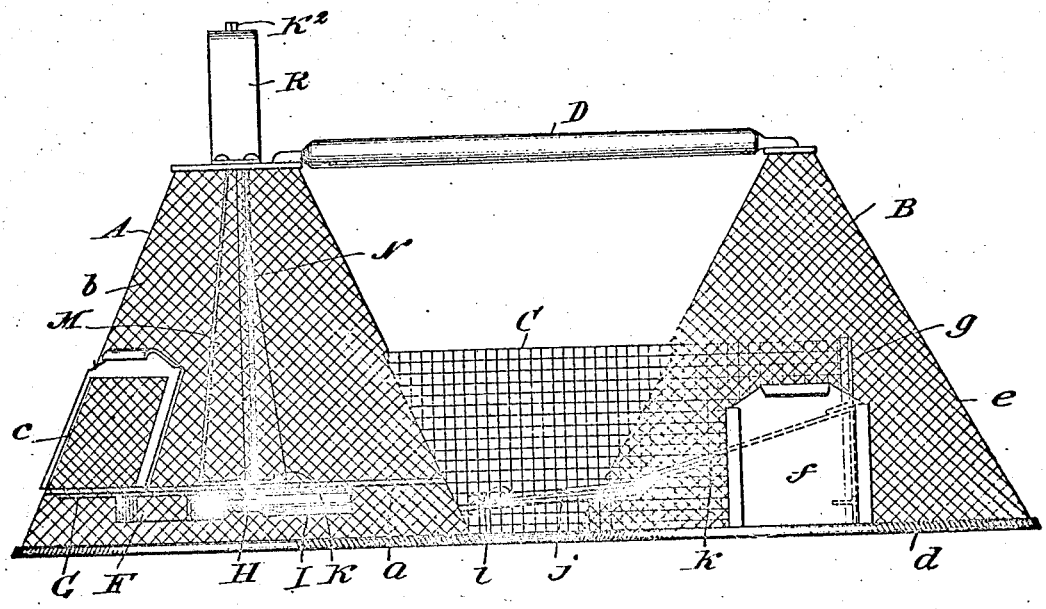
Figure 2:
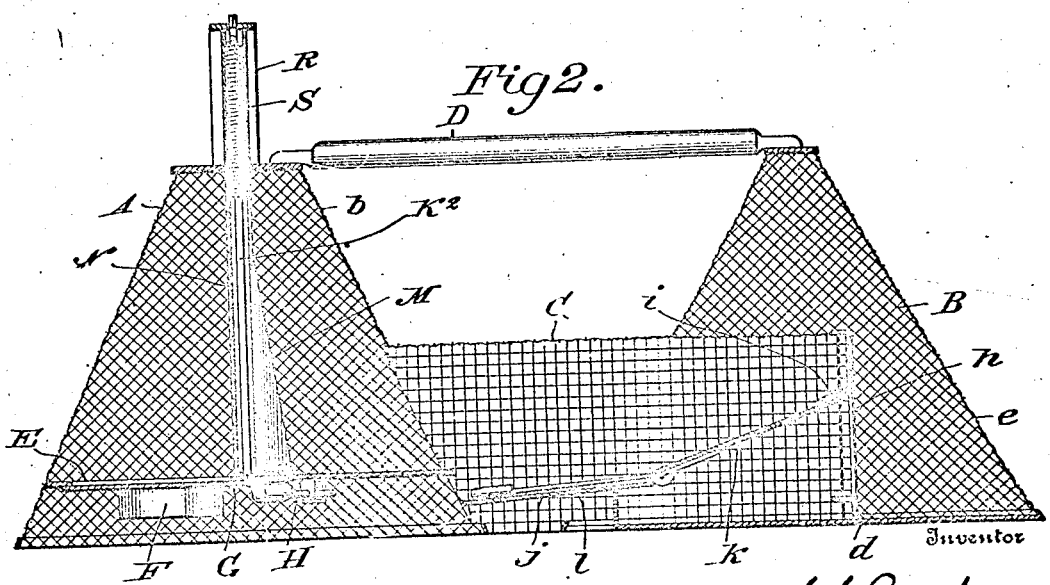
Figure 3:
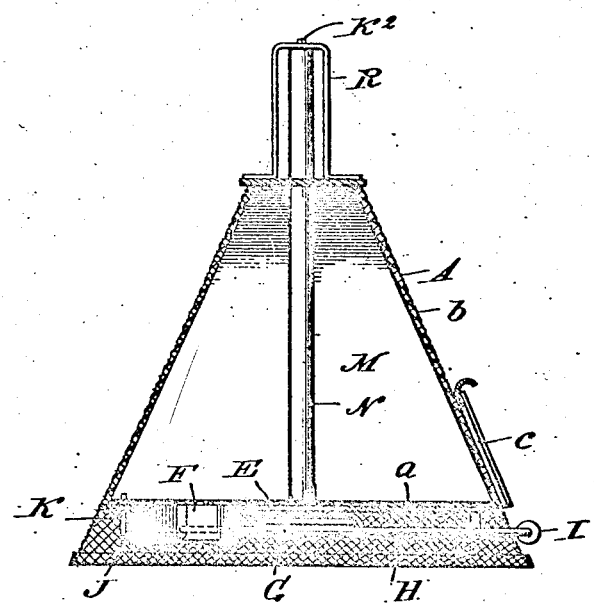
Figure 4:
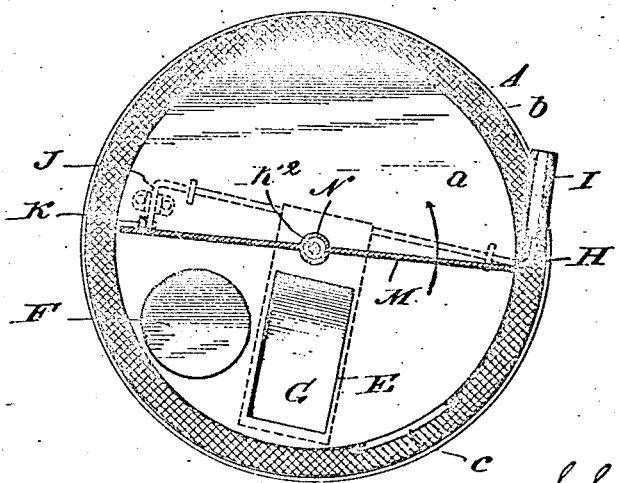

With the foregoing in mind, the invention will be fully understood from the following description and claims when the same are read in connection with the drawings, accompanying and forming part of this specification, in which:

Figure 1 is a side elevation of a rat trap constituting a practical embodiment of my invention. Fig. 2 is a longitudinal vertical section of the same. Fig. 3 is a vertical section taken through the primary cage of the trap at a right angle to Fig. 2. Fig. 4 is a horizontal section taken through the said primary cage of the trap in a plane above the floor thereof.

Similar letters designate corresponding parts in all of the views of the drawings, referring to which:

A is the primary cage of my novel rat trap, and B is the secondary cage thereof. The primary cage A is formed by a floor $a$ and a preferably cone-shaped wall $b$ of woven wire, and is provided in the said wall $b$ with an entrance opening $c$. The secondary cage B is formed by a floor $d$ and a preferably cone-shaped wall $e$ of woven wire, and is provided in said wall $e$ with an eduction opening normally closed by a slidable door $f$, as shown, or any other suitable door compatible with the purpose of my invention.

Extending between and connecting the primary and secondary cages is a passage C which projects into the secondary cage and is there provided with an end wall $g$ having an opening $h$ in its lower portion and also having a flange $i$ disposed above the said opening. The said passage C is constructed with a fixed floor $j$ and a tilting platform $k$; the latter being fulcrumed at a point adjacent to the forward end of the fixed floor $j$, and being normally held by a weighted arm $l$ in the position illustrated—i. e., with its forward end bearing upward against the under side of the flange $i$. Thus it will be manifest that when a rat finds its way from the primary cage A into the passage C, it will walk along the fixed floor $j$ and then forward on the platform $k$, whereupon the said platform will tilt to permit the rat to pass through the opening $h$ into the secondary cage B, and then will be returned by the weighted arm $l$ illustrated so as to preclude the return of the rat from the said secondary cage through the passage C.

For convenience in handling the trap as a whole, I prefer to connect the upper portions of the primary and secondary cages A and B through the medium of a bar D which may be and preferably is formed by a tube of sheet-metal.

In the floor $a$ of the primary cage A is formed an opening E which is disposed between the entrance opening $c$ and a bait receptacle F, as best shown in Fig. 4. Under the said opening E is arranged a tilting platform G which is fixed at one end to a rock-shaft H, journaled in suitable bearings on the under side of the floor $a$, as illustrated. The said rock-shaft H is provided at one end with a weighted arm I, and at its opposite end it has an arm J connected to a bolt K which extends upward through the floor $a$ for an important purpose hereinafter pointed out. At this point attention is directed to the fact that in passing from the entrance opening $c$ to the bait receptacle F, a rat will step on the platform G and tilt said platform and rock the shaft H and raise the weighted arm I and depress the arm J and thereby draw the bolt K downward. When the rat moves or is moved off the platform G, the gravitation of the weighted arm I will obviously operate to raise the platform G and the bolt K to their normal positions.

Movable about a shaft $K^2$ fixed to the floor $a$ of the primary cage A is a swinging partition wall M which is preferably, though not necessarily, formed of sheet-metal and is shaped correspondingly to the conical wall $b$ of the said primary cage. The said swinging partition wall M is preferably provided with a central tube N, and this latter extends through an opening in the top of the primary cage A and receives the shaft $K^2$ which is also held against rotation in a frame R fixed to and rising from the top of the cage A. In the upper portion of tube N is arranged a coiled spring S which is connected at one of its ends to the tube N and at its opposite end to the shaft K² and is so disposed that it will be placed under tension by rotation of the tube N and partition wall M in the direction indicated by the arrow in Fig. 4. When it is necessary to place the said spring S under tension, the weighted arm I is raised and held in a raised position to hold the bolt K in its lower position, and the partition M and the tube N are turned by manipulation of the latter until the spring S is compressed to the desired extent, whereupon the weighted arm I is released and permitted to gravitate so as to raise the bolt K and enable the latter to prevent movement of the partition M in the direction opposite to that indicated by the arrow in Fig. 4.

The partition wall M normally rests against the bolt K and in a position between the passage C and that portion of the floor of the primary cage A provided with the tilting platform G and the bait receptacle F. Consequently it will be manifest that when a rat enters the primary cage through the opening c it will, in moving toward the bait receptacle F, step upon and depress the platform G so as to rock the shaft H and draw the bolt K downward out of the path of the swinging partition wall M, whereupon the spring S will quickly move the partition wall M in the direction opposite to that indicated by arrow in Fig. 4, so as to cause the rat to move to a position on the floor a at the opposite side of the platform G, with reference to the entrance opening c. The spring S will also move the partition wall M in the direction last stated until the wall again brings up against the bolt K which is then in a raised position because of the weight of the rat having been removed from the platform G. At this time it will be manifest that the rat is separated from the entrance opening c by the partition wall M, and that it can only find egress from the primary cage A through the passage C, and when the rat moves through the said passage it will be caught in the secondary cage B in the manner before described, and effectually prevented from escaping from the said secondary cage.

It will be gathered from the foregoing that immediately after a rat is caught by the movement of the partition wall M under the action of the spring S, the trap is in readiness to catch any other rats that may find their way into the primary cage A through the entrance opening c.

It will also be appreciated from the foregoing that the trap as a whole is simple and inexpensive in construction and is well adapted to withstand the usage to which devices of corresponding character are ordinarily subjected.

When deemed expedient, the cage A may be used without the secondary cage B and the passage C, in which event the said cage A will be provided with a suitable door (not shown) to control the eduction opening thereof.

As before stated, the construction herein illustrated and described constitutes the best practical embodiment of my invention of which I am cognizant, but it is obvious that in the future practice of the invention such changes or modifications may be made as fairly fall within the scope of my invention as defined in the claims appended.

Having described my invention, what I claim and desire to secure by Letters-Patent, is:

1. The combination in a rat trap, of a cage having an entrance opening, a vertically tilting platform arranged in the cage, means for raising said platform and yieldingly holding the same in a raised position, a horizontally swinging partition wall mounted in the cage, a spring arranged to be placed under tension by swinging of the partition wall in one direction and to expand and swing the partition wall in the opposite direction, a bolt movable into and out of the path of the horizontally swinging partition, and a connection intermediate the vertically tilting platform and the bolt arranged on depression of the platform to withdraw the bolt from the path of the partition wall.

2. The combination in a rat trap, of a cage having an entrance opening, a swinging partition wall mounted in said cage, a spring arranged to be placed under tension by swinging of the partition wall in one direction and to expand and swing the partition wall in the opposite direction, a movable bolt for normally holding the partition wall against swinging movement, a rock-shaft having an arm connected with the bolt, a platform carried by said rock-shaft and arranged to be depressed by a rat in the trap, and means for yieldingly holding the said platform in a raised position.

3. The combination in a rat trap, of a cage having an entrance opening, a frame fixed to and rising from said cage, a shaft fixed in said frame, a swinging partition wall mounted in the cage and having a tube which extends up into the frame and receives the fixed shaft, a coiled spring arranged in said tube and connected at one end thereto and at its opposite end to the shaft, a movable bolt for normally holding the partition wall against movement, a platform arranged to be depressed by a rat in the cage, a connection between the platform and the bolt for withdrawing the latter on depression of the former, and means for yieldingly holding the platform in a raised position.

4. The combination in a rat trap, of a primary cage, a secondary cage, a passage connecting the cages and controlled by a tilting platform and means for returning said platform to and normally retaining the same in a raised position, a swinging partition wall mounted in the primary cage, a spring arranged to be placed under tension by swinging of the partition wall in one direction and to expand and swing the partition wall in the opposite direction, a tilting platform arranged in the primary cage, means for raising said platform and yieldingly holding it in a raised position, and a bolt for normally holding the partition wall against movement under the action of its spring; said bolt being connected and movable with the platform and arranged on depression of the latter to release the partition wall.

In testimony whereof I have hereunto set my hand in presence of two subscribing witnesses.

SANFORD STEWART BOYD.

Witnesses:
W. B. KNIGHT,
W. H. TRUM.